Aug. 18, 1936.                 D. D. WILE                  2,051,509
                                 VALVE
                          Filed Oct. 21, 1933
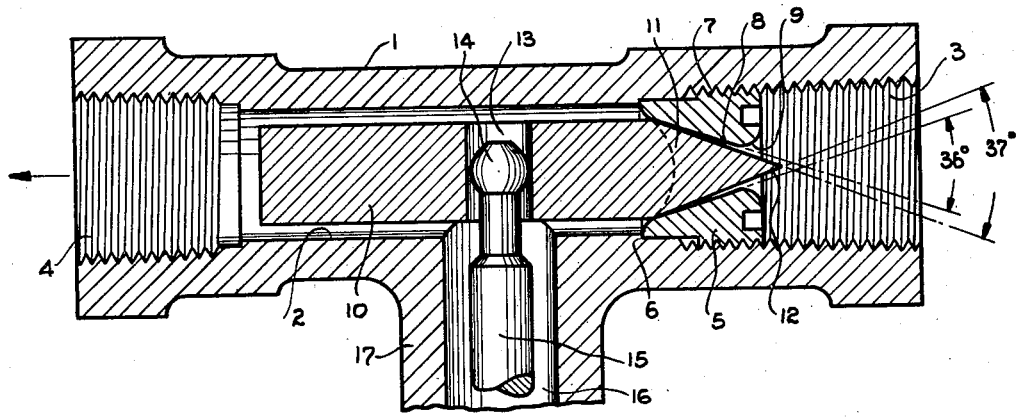
FIG. 1
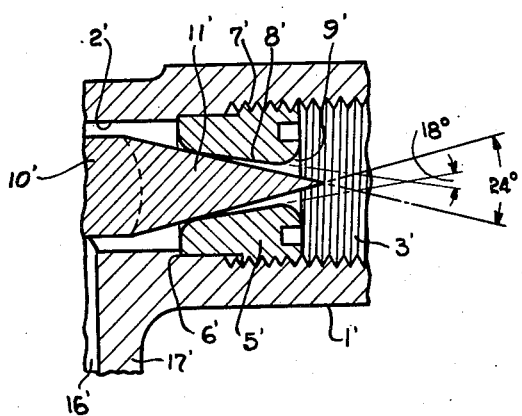          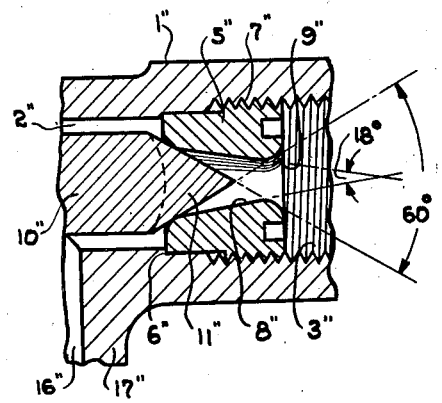
FIG. 2                         FIG. 3
INVENTOR
Daniel D. Wile
BY
Andrew K. Foulds
ATTORNEY Patented Aug. 18, 1936

2,051,509

UNITED STATES PATENT OFFICE 2,051,509

VALVE

Daniel D. Wile, Detroit, Mich., assignor to Detroit Lubricator Company, Detroit, Mich., a corporation of Michigan Application October 21, 1933, Serial No. 694,524

7 Claims. (Cl. 251—27)

My invention relates to new and useful improvements in valves and has for one object the provision of means whereby the hissing sound due to flow of liquid through the valve will be substantially eliminated.

Another object is to provide a valve which is quiet in operation and which will operate efficiently.

The invention consists in the improved construction, to be more fully described hereinafter, and the novelty of which will be particularly pointed out and distinctly claimed.

In the accompanying drawing, to be taken as a part of this specification, I have fully and clearly illustrated several embodiments of my invention, in which drawing—

Figure 1 is a view in longitudinal central section through a valve embodying my invention.

Figs. 2 and 3 are detail views in longitudinal central section of valves of different form and also embodying my invention.

Referring to the drawing by characters of reference, 1 designates a valve housing or casing having a passageway 2 extending therethrough. The casing 1 is preferably of elongated form and substantially cylindrical, having an inlet 3 and an outlet 4 which communicate with the opposite ends of the passageway 2. The inlet 3 and the outlet 4 are each preferably internally threaded for connection of the casing 1 in a conduit or pipe line. Within the passageway 2 adjacent the inlet 3 there is an annular valve seat member 5, preferably in the form of a sleeve which seats at its inner end against an annular shoulder 6 in the passageway 2 and which is preferably removably secured in the passageway 2 by screw-threaded engagement, as at 7, with the casing 1. Through the member 5 there is a valve port 8 concentric with the passageway 2 and which tapers or converges toward the inlet end 3 of the casing 1. The angle included between oppositely positioned elements on the wall surface of the port 8 is substantially 36 degrees. The port 8 is flared outwardly, as at 9, at the inlet end of the member 5 so that the port 8 is of converging-diverging form in the direction of flow from the inlet 3 to the outlet 4. By forming the wall of the inlet flared or rounded, as at 9, it will be seen that a portion of the port or orifice 8, at the inlet, has a gradual decreasing flow capacity. Accordingly, the liquid under pressure in the casing inlet 3, upon passing through the inlet portion of gradual decreasing flow capacity, will have a corresponding gradual increase in its velocity with the result that noise which occurs, due to abrupt change in velocity of a confined liquid passing from one size passage to another under pressure, will be substantially eliminated. Within the passageway 2 there is a valve member 10 which is preferably polygonal in transverse cross-section so as to permit flow through the passageway 2 along the sides of the valve member, the diagonals of the valve member being substantially equal to the internal diameter of the passageway 2 so that the valve member is guided for reciprocation by the walls of the passageway. The valve member 10 is provided with a tapered valve portion 11, preferably substantially conical and the surface of which converges toward the inlet 3. The taper of the portion 11 is preferably such that oppositely positioned elements on the surface of the portion 11 make with each other an angle of substantially 37 degrees. The length of the portion 11 is also preferably such that when the portion 11 is in seating engagement with the wall of the port 8, the converging or pointed end of the portion 11 will extend completely through the port 8 and project from the member 5, as at 12. It will be noted, by reason of the fact that the convergence of the port 8 is at a greater acute angle than the angle at which the valve portion 11 converges, that the respective converging surfaces diverge relative to each other toward the inlet 3 whereby the valve portion 11 seats adjacent the outlet end of the port 8. The valve member 10 is provided with a transverse opening 13 which receives the end portion 14 of a rockable or laterally movable valve actuating member 15 by which the valve may be reciprocated relative to the member 5 and into and out of the port 8. The operating member 15 extends through the bore 16 of a hollow extension 17 carried by the casing 1, the bore 16 opening into the passageway 2 and preferably being sealed by any suitable means such as a diaphragm not shown through and in which the operating member 15 may be extended and sealed to prevent leakage from the passageway 2 through the bore 16.

In Fig. 2, the valve is composed of like elements as described above with respect to Fig. 1, and therefore the primes of the reference numerals applied to Fig. 1 designate like parts in Fig. 2. The construction of the valve in Fig. 2 differs from that of Fig. 1 merely by the angles of taper or convergence of the valve port and of the valve portion which cooperates therewith, being respectively 18 degrees and 24 degrees, the difference between the valve of Fig. 2 and that of Fig. 1 being in the greater angle of divergence between the wall surface of the valve port and the surface of the valve portion.

In Fig. 3, the valve is composed of like elements as described above with respect to Fig. 1, and therefore the double primes of the reference numerals applied to Fig. 1 designate like parts in Fig. 3. In Fig. 3, the valve portion 11″ converges at an angle of 60 degrees and the wall of the port 8″ converges at an angle of 18 degrees, as in Fig. 2. By reason of the particular angles of convergence of the valve portion and the bore of the valve port, the angle of divergence between the surface of the valve portion and the surface of the valve port is greater than the divergence of the surfaces in either Fig. 1 or Fig. 2.

In operation, liquid admitted under pressure at the inlet 3 will flow through the port 8 in a film of decreasing thickness toward the outlet end of the port 8, the volume of flow being controlled by operation of the operating member 15 and being determined by the annular flow space between the valve portion 11 and the wall of the port 8 at the outlet end of the valve port, the liquid passing through the port 8 flowing through the passageway 2 along the sides of the valve member 10 and discharging through the outlet 4. By the constructions disclosed in Figs. 1, 2, and 3, it is possible to obtain a throttled flow of liquid under high head pressure without the accompanying hissing sound which occurs in the usual throttled metering valve.

What I claim and desire to secure by Letters Patent of the United States is:

1. A valve for controlling the flow of liquid under pressure, comprising a casing having a passageway therethrough, said passageway having an inlet valve port and an oppositely disposed outlet port, and a valve member cooperable with said inlet port to control flow through said passageway, said valve member having a tapered valve portion such that the surface of said portion converges at an acute angle toward the inlet end of said passageway, said tapered valve portion having a smooth unbroken surface, said port having a wall surface surrounding said valve portion and converging at an acute angle toward said inlet end, the angle included between oppositely positioned extended surface elements of said wall surface being less than the angle between oppositely positioned extended surface elements of said tapered portion whereby said converging surfaces diverge relative to each other and noise due to flow of liquid under pressure through the open port is substantially eliminated.

2. A valve for controlling the flow of liquid under pressure, comprising a casing having a passageway therethrough, and a valve member in said passageway and having a tapered valve portion having a smooth unbroken surface, said passageway having a tapered orifice cooperable with said valve portion to control flow through said passageway, said orifice having an inlet flaring outwardly to provide for a gradual increase in the velocity of the liquid entering said orifice, said valve portion and said orifice tapering toward the inlet end of said passageway, the taper of said orifice being more gradual than the taper of said valve portion, whereby the tapered surfaces diverge relative to each other and noise due to flow of liquid under pressure through the open port is substantially eliminated.

3. A valve for controlling the flow of liquid under pressure, comprising a casing having a passageway therethrough, and a valve member in said passageway and having a tapered valve portion, said passageway having a tapered orifice cooperable with said valve portion to control flow through said passageway, said valve portion and said orifice tapering toward the inlet end of said passageway, said tapered orifice being flared outwardly at the inlet to provide for a gradual increase in the velocity of the liquid entering said orifice, the taper of said orifice being more gradual than the taper of said valve portion, whereby the tapered surfaces diverge relative to each other and are spaced from each other at the inlet end of said orifice when said valve portion is in engagement with the wall of said orifice, said tapered valve portion diverging in the direction of flow whereby noise of liquid passing through the open valve port is substantially eliminated.

4. A valve for controlling the flow of liquid under pressure, comprising a casing having a passageway therethrough, and a valve member in said passageway and having a tapered valve portion, said passageway having a tapered orifice cooperable with said valve portion to control flow through said passageway, said valve portion and said orifice having smooth unbroken cooperative surfaces tapering at different angles toward the inlet end of said passageway, the taper of said orifice being so related to the taper of said valve portion that the angle of divergence between the surface of said portion and the surface of said orifice is not more than three degrees whereby noise of liquid passing through the open valve port will be substantially eliminated.

5. A valve for controlling the flow of liquid under pressure, comprising a casing having a passageway therethrough, and a valve member in said passageway and having a smooth unbroken tapered valve portion, said passageway having a smooth unbroken tapered orifice cooperable with said valve portion to control flow through said passageway, said valve portion and said orifice tapering at different angles toward the inlet end of said passageway, the taper of said orifice being so related to the taper of said valve portion that the angle of divergence between the surface of said portion and the surface of said orifice is substantially one-half of a degree whereby noise of liquid passing through the open valve port will be substantially eliminated.

6. A valve for controlling the flow of liquid under pressure, comprising a casing having a passageway therethrough, said passageway having a tapered orifice with the surface thereof converging toward and to a point adjacent the inlet port of the orifice and then diverging to the inlet port, a valve member in said passageway having a tapered valve portion cooperating with said tapered orifice to control flow of liquid therethrough, said tapered valve portion tapering toward said inlet at a greater rate than the rate of taper of the tapered orifice whereby the converging surfaces diverge relative to each other at a uniform rate to the diverging portion at the inlet whereby noise of liquid passing through the open valve port under pressure will be substantially eliminated.

7. A valve for controlling the flow of liquid under pressure comprising a casing having a passageway therethrough, said passageway having a tapered orifice with the surface thereof converging toward the inlet and having its surface flaring outwardly and rounded at the inlet so that there will be a gradual change in the velocity of the liquid entering said orifice, a valve member in said passageway and having a tapered valve portion cooperating with said tapered orifice to control flow of liquid therethrough, said tapered valve portion tapering toward said inlet at a greater rate than the rate of taper of the tapered orifice whereby the converging surfaces diverge relative to each other and toward the inlet whereby noise of liquid passing through the orifice will be substantially eliminated.

DANIEL D. WILE.